(12) United States Patent
Hinterdorfer et al.

(10) Patent No.: US 12,287,269 B2
(45) Date of Patent: *Apr. 29, 2025

(54) METHOD FOR DETERMINING THE PARTICLE SIZE DISTRIBUTION OF PARTS OF A BULK MATERIAL FED ONTO A CONVEYOR BELT

(71) Applicant: Rubble Master HMH GmbH, Linz (AT)

(72) Inventors: Christian Hinterdorfer, Gutau (AT); Christian Hinterreiter, Obergrünburg (AT)

( * ) Notice: Subject to any disclaimer, the term of this patent is extended or adjusted under 35 U.S.C. 154(b) by 247 days.

This patent is subject to a terminal disclaimer.

(21) Appl. No.: 17/789,877

(22) PCT Filed: May 10, 2021

(86) PCT No.: PCT/AT2021/060164
§ 371 (c)(1),
(2) Date: Jun. 29, 2022

(87) PCT Pub. No.: WO2021/226648
PCT Pub. Date: Nov. 18, 2021

(65) Prior Publication Data
US 2023/0175945 A1    Jun. 8, 2023

(30) Foreign Application Priority Data

May 13, 2020  (AT) ............................... A 50423/2020

(51) Int. Cl.
*G01N 15/0227*  (2024.01)
*G06T 7/62*  (2017.01)
(Continued)

(52) U.S. Cl.
CPC ........... *G01N 15/0227* (2013.01); *G06T 7/62* (2017.01); *G06V 10/267* (2022.01);
(Continued)

(58) Field of Classification Search
CPC ................. G01N 15/0227; G06T 7/62; G06T 2207/10028; G06T 2207/2008;
(Continued)

(56) References Cited

U.S. PATENT DOCUMENTS

| 8,233,667 B2 | 7/2012 | Helgason et al. |
| 2008/0192987 A1 | 8/2008 | Helgason et al. |

(Continued)

FOREIGN PATENT DOCUMENTS

| CN | 110263192 A | * | 9/2019 | ............. G06F 16/50 |
| CN | 110838128 A | * | 2/2020 | ............. G01N 15/00 |

(Continued)

OTHER PUBLICATIONS

English language abstract for CN110838128A, Feb. 25, 2020.
(Continued)

*Primary Examiner* — Utpal D Shah
*Assistant Examiner* — Jack Peter Kraynak
(74) *Attorney, Agent, or Firm* — Tiajoloff & Kelly LLP

(57) ABSTRACT

In a method for determining the particle size distribution of parts of a bulk material (2) fed onto a conveyor belt (1), a depth image (6) of parts of the bulk material (2) is captured in a capturing region (4) by means of a depth sensor (3). In order to reliably classify bulk material at conveying speeds of more than 2 m/s even if there are overlaps, without having to take structurally complicated measures for this purpose, the captured two-dimensional depth image (6) is fed to a convolutional neural network, which has been trained in advance and which has at least three convolutional layers lying one behind the other and one downstream amount classifier (22) per class of a particle size distribution, the output values (21) of which amount classifiers are output as the particle size distribution of the bulk material present in the capturing region (4).

13 Claims, 3 Drawing Sheets

(51) Int. Cl.
*G06V 10/26* (2022.01)
*G06V 10/44* (2022.01)
*G06V 10/82* (2022.01)
*G06V 20/00* (2022.01)

(52) U.S. Cl.
CPC ............ *G06V 10/454* (2022.01); *G06V 10/82* (2022.01); *G06V 20/00* (2022.01); *G06T 2207/10028* (2013.01); *G06T 2207/20081* (2013.01); *G06T 2207/20084* (2013.01); *G06T 2207/20212* (2013.01)

(58) Field of Classification Search
CPC ........... G06T 2207/20084; G06T 2207/20212; G06V 10/454; G06V 10/82; G06V 10/267
See application file for complete search history.

(56) References Cited

U.S. PATENT DOCUMENTS

| | | | |
|---|---|---|---|
| 2016/0370274 A1* | 12/2016 | Rowe | |
| 2017/0367771 A1* | 12/2017 | Tako | G16H 20/40 |
| 2019/0011183 A1 | 1/2019 | Baumert et al. | |
| 2019/0012768 A1* | 1/2019 | Tafazoli Bilandi | G06T 7/13 |
| 2022/0058827 A1* | 2/2022 | Montserrat | G06V 20/64 |
| 2023/0214458 A1* | 7/2023 | Marsden | G06V 40/28 382/157 |

FOREIGN PATENT DOCUMENTS

| | | | | |
|---|---|---|---|---|
| CN | 110852395 A | | 2/2020 | |
| EP | 1484118 A1 | * | 12/2004 | ............... B07C 5/14 |
| WO | 2006/027802 A1 | | 3/2006 | |
| WO | WO-2020049517 A1 | * | 3/2020 | ......... G01N 15/0227 |

OTHER PUBLICATIONS

English language abstract for CN110852395A, Feb. 28, 2020.
Hutson, "Artificial intelligence faces reproducibility crisis", Science (New York, N.Y.) 359, pp. 725-726. 10.1126/science. 359.6377.725. Feb. 16, 2018 http://pamt.at/em1r.
Charrington, "The Reproducibility Crisis and Why it's Bad for AI", towardsdatascience.com. Mar. 22, 2018. http://pamt.at/ei4f.
Steinhaus, "KIErgebnisse oft nicht nachvollziehbar", IT-Zoom. Apr. 25, 2018. http://pamt.at/c5qm.
Beam, "Challenges to the Reproducibility of Machine Learning Models in Health Care", JAMA vol. 323(4) (2020): 305-306. doi: 10.1001/jama. 2019.20866. Jan. 6, 2020. http://pamt.at/83js.
Kobran, "Reproducibility in Machine Learning", AI Wiki. 2020. http://pamt.at/ytam.
Sermanent et al., "OverFeat: Integrated Recognition, Localization and Detection using Convolutional Networks", arxiv.org/abs/1312. 6229, XP055545560, Dec. 21, 2013.
Simonyan et al., "Very Deep Convolutional Networks for Large-Scale Image Recognition", Conference paper ICLR 2015, arXiv:1409. 1556v6, XP055270857, Sep. 4, 2014.
U.S. Appl. No. 17/795,514, filed Jul. 26, 2022 (U.S. national stage of PCT/AT2021/060140) for Method for Cleaning Blinding Particles in Crushers.
U.S. Appl. No. 17/799,998, filed Aug. 16, 2022 (U.S. national stage of PCT/AT2021/060163) for Method for Detecting Wear in Crushers During Idle Operation.
U.S. Appl. No. 17/800,010, filed Aug. 16, 2022 (U.S. national stage of PCT/AT2021/060169) for Method for Controlling a Crusher.
U.S. Appl. No. 17/800,031, filed Aug. 16, 2022 (U.S. national stage of PCT/AT2021/060162) for Method for Determining, in Parts, the Volume of a Bulk Material Fed Onto a Conveyor Belt.
U.S. Appl. No. 17/800,041, filed Aug. 16, 2022 (U.S. national stage of PCT/AT2021/060165) for Method of Dust Suppression for Crusherswith Spraying Devices.
U.S. Appl. No. 17/785,800, filed Jun. 15, 2022 (U.S. national stage of PCT/AT2021/060141) for Method for Determining the Bulk Density of Bulk Material in a Mobile Crusher.
U.S. Appl. No. 17/789,877, filed Jun. 29, 2022 (U.S. national stage of PCT/AT2021/060164) for Method for Determining the Particle Size Distribution of Parts of a Bulk Material Fed Onto a Conveyor Belt, (this application); and.
U.S. Appl. No. 17/784,351, filed Jun. 10, 2022 (U.S. national stage of PCT/AT2021/060011) for Device for a Crusher.

* cited by examiner

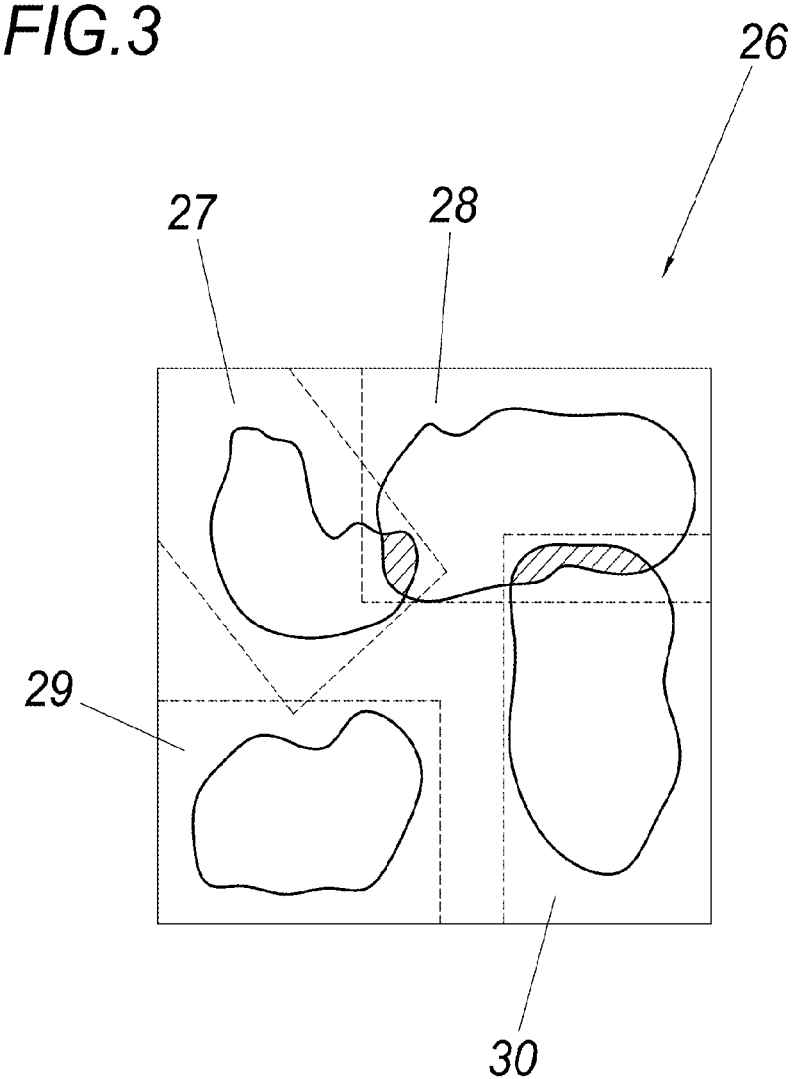

METHOD FOR DETERMINING THE PARTICLE SIZE DISTRIBUTION OF PARTS OF A BULK MATERIAL FED ONTO A CONVEYOR BELT

FIELD OF THE INVENTION

The invention relates to a method for determining the grain size distribution of parts of a bulk material fed onto a conveyor belt, wherein a depth image of the bulk material is captured in sections in a capturing region by a depth sensor.

DESCRIPTION OF THE PRIOR ART

It is known (WO2006027802A1) to measure bulk material on a conveyor belt by means of a dual camera and laser triangulation and to calculate and classify its properties, such as the volume or the geometry of the bulk material, from the measurement data.

However, a disadvantage of the prior art is that these photogrammetric methods are very time-consuming in determining the volume of the bulk material, since a series of complicated detection and measurement algorithms must be carried out for each detected grain in the bulk material, which require high computing times in total due to the high number of grains and the individual computing effort per grain. Furthermore, in this method, the grains must not overlap on the conveyor belt, which is, however, unavoidable in realistic conveyor operation. Due to these limitations, only about 100-200 grains can be measured per hour in the prior art. Since common conveyor belts transport by far more grains than prior art methods can measure in the same period of time, the application of known measuring methods results in a significant slowdown of the conveying speed and thus in productivity losses. Even with sophisticated systems that require a large amount of space, only belt speeds of less than 2 m/s can be achieved in this way.

SUMMARY OF THE INVENTION

The invention is thus based on the object of classifying bulk material reliably at conveying speeds of more than 2 m/s, even in the case of overlaps, without having to take elaborate measures in terms of design.

The invention solves the object by feeding the acquired two-dimensional depth image to a previously trained convolutional neural network, which has at least three convolutional layers, one behind the other, and a downstream amount classifier, for example a fully connected layer, for each class of a grain size distribution, the output values of which are output as a grain size distribution of the bulk material present in the capturing region. This grain size distribution is a histogram, which can be formed either with absolute amount values or with relative amount values related to the bulk material volume, and thus provides important conclusions, for example about the crushing gap, any disturbances or other process parameters of a crusher. The invention is thus based on the consideration that, when two-dimensional depth images are used, the information necessary for grain size distribution determination can be extracted from the depth information after a neural network used for this purpose has been trained with training depth images with a known grain size distribution. The convolutional layers reduce the input depth images to a series of individual features, which are in turn evaluated by the downstream amount classifier, so that the grain size distribution of the material mapped in the input depth image can be determined as a result. The number of convolutional layers provided, each of which may be followed by a pooling layer for information reduction, may be at least three, preferably five, depending on the available computing power. Between the convolutional layers and the downstream amount classifier, a dimension reduction layer, a so-called flattening layer, can be provided in a known manner. Since in the depth image the distance of the imaged object to the depth sensor is mapped with only one value per pixel, the amount of data to be processed can be reduced in contrast to the processing of color images, the measurement procedure can be accelerated and the memory requirement necessary for the neural network can be reduced. As a result, the neural network can be implemented on inexpensive AI parallel computing units with GPU support and the method can be used regardless of the color of the bulk material. Also, the grain size distribution can be determined by accelerating the measurement procedure even at conveyor belt speeds of 3 m/s, preferably 4 m/s. This reduction of the amount of data in the image additionally lowers the error rate for the correct determination of the grain size distribution. In contrast to color or grayscale images, the use of depth images has the additional advantage that the measurement procedure is largely independent of changing exposure conditions. For example, a vgg16 network (Simonyan/Zisserman, Very Deep Convolutional Networks for Large-Scale Image Recognition, 2015), which is usually only used for color images, can be used as a neural network, which is reduced to only one channel, namely for the values of the depth image points. The depth image can be acquired, for example, with a 3D camera, since this can be arranged above a conveyor belt even when space is limited, due to the smaller space required. Thus, the measures according to the invention can be used to automatically record the screening curve of crushers at high speeds, which can conventionally only be determined with great effort, since no parameters for individual grains have to be recorded and relevant quantities calculated from them. The determination of the grain size distribution directly from the depth image thus also reduces the susceptibility to errors when determining the grain size distribution. In addition, in order to compensate for fluctuations in the acquisition of the grain size distribution and to compensate for erroneous output values of the neural network, several successive output values can be averaged and the average value can be output as the grain size distribution of the bulk material present in the capturing region.

Training the neural network becomes more difficult and the measuring accuracy decreases during operation if elements foreign to the bulk material lie within the capturing region of the depth sensor. These include, for example, vibrating components of the conveyor belt itself, or other machine elements. To avoid the resulting disturbances, it is suggested that the values of those pixels are removed from the depth image and/or the training depth image whose depth corresponds to or exceeds a pre-detected distance between the depth sensor and a background for this pixel. This allows disturbing image information, caused for example by vibrations of the conveyor belt, to be removed and both the depth images and the training images to be limited to the information relevant for the measurement.

However, the grain size distribution is not sufficient on its own to determine process parameters, as required in particular for use in crushers. Therefore, it is suggested that a volume classifier be placed downstream of the convolutional layers and that the output value of this volume classifier be output as the bulk material volume present in the capturing region. If the grain size distribution per class is available in relative percentages and not in absolute values, the determined volume can be used to infer the absolute volume fraction per grain size distribution class.

In order to better classify the bulk material on the basis of its mechanical properties, it is proposed that a cubicity classifier is placed downstream of the convolutional layers, the initial value of which is output as cubicity. Cubicity is considered to be the axial ratio of individual grains of the bulk material, which is, for example, the quotient of the length and thickness of the grain.

The training of the neural network requires large quantities of training depth images that represent the bulk material to be detected as accurately as possible. However, the amount of work required to measure the necessary amount of bulk material is extremely high. In order to provide the neural network with sufficient training depth images to determine the volume of the bulk material, it is suggested that first sample depth images of a sample grain with a known volume are acquired and stored together with the volume, whereupon several sample depth images are randomly combined to form a training depth image, whereupon the training depth image on the input side and the assigned grain size distribution on the output side are fed to the amount classifiers of the neural network and the weights of the individual network nodes are adjusted in a learning step. The training method is thus based on the consideration that manifold combinations of training depth images can be created by combining example depth images of measured example grains. Thus, it is sufficient to acquire sample depth images of relatively few sample grains with the associated grain size distribution to generate a large number of training depth images with which the neural network can be trained. To train the neural network, the weights between the individual network nodes are adjusted in a known manner in the individual training steps so that the actual output value corresponds as closely as possible to the specified output value at the end of the neural network. Different activation functions can be specified at the network nodes, which are decisive for whether a sum value present at the network node is passed on to the next level of the neural network. Analogous to the grain size distribution, other parameters, such as cubicity, foreign matter or impurity content or volume, can also be assigned to the sample depth images. For depth image processing, it is also suggested here that the values of those pixels are removed from the depth image whose depth corresponds to or exceeds a pre-detected distance between the depth sensor and the conveyor belt for that pixel. As a result, the training depth images and the depth images of the measured bulk material have only the information relevant for the measurement, which results in a more stable training behavior and increases the recognition rate in the application. By selecting the example depth images or the training depth images composed of them, the neural network can be trained on any type of bulk material. To further improve the training behavior and recognition rate, it is proposed that the sample depth images are assembled with random alignment to form a training depth image. Thus, for a given number of grains per example depth image, the number of possible arrangements of the grains is significantly increased without the need to generate more example depth images and overfitting of the neural network is avoided.

Separation of the grains of the bulk material can be omitted and larger bulk material volumes can be determined at constant conveyor belt speed if the example depth images are combined with partial overlaps to form a training depth image, wherein the depth value of the training depth image in the overlap area corresponds to the smallest depth of both example depth images. In order to capture realistic bulk distributions, the cases where two grains come to rest on top of each other must be considered. The neural network can be trained to detect such overlaps and still determine the volume of the example grains.

BRIEF DESCRIPTION OF THE DRAWINGS

In the drawings, the subject matter of the invention is shown by way of example, wherein:

FIG. 3 shows a training depth image composed of four example depth images.

DETAILED DESCRIPTION OF THE PREFERRED EMBODIMENTS

Figure 1:
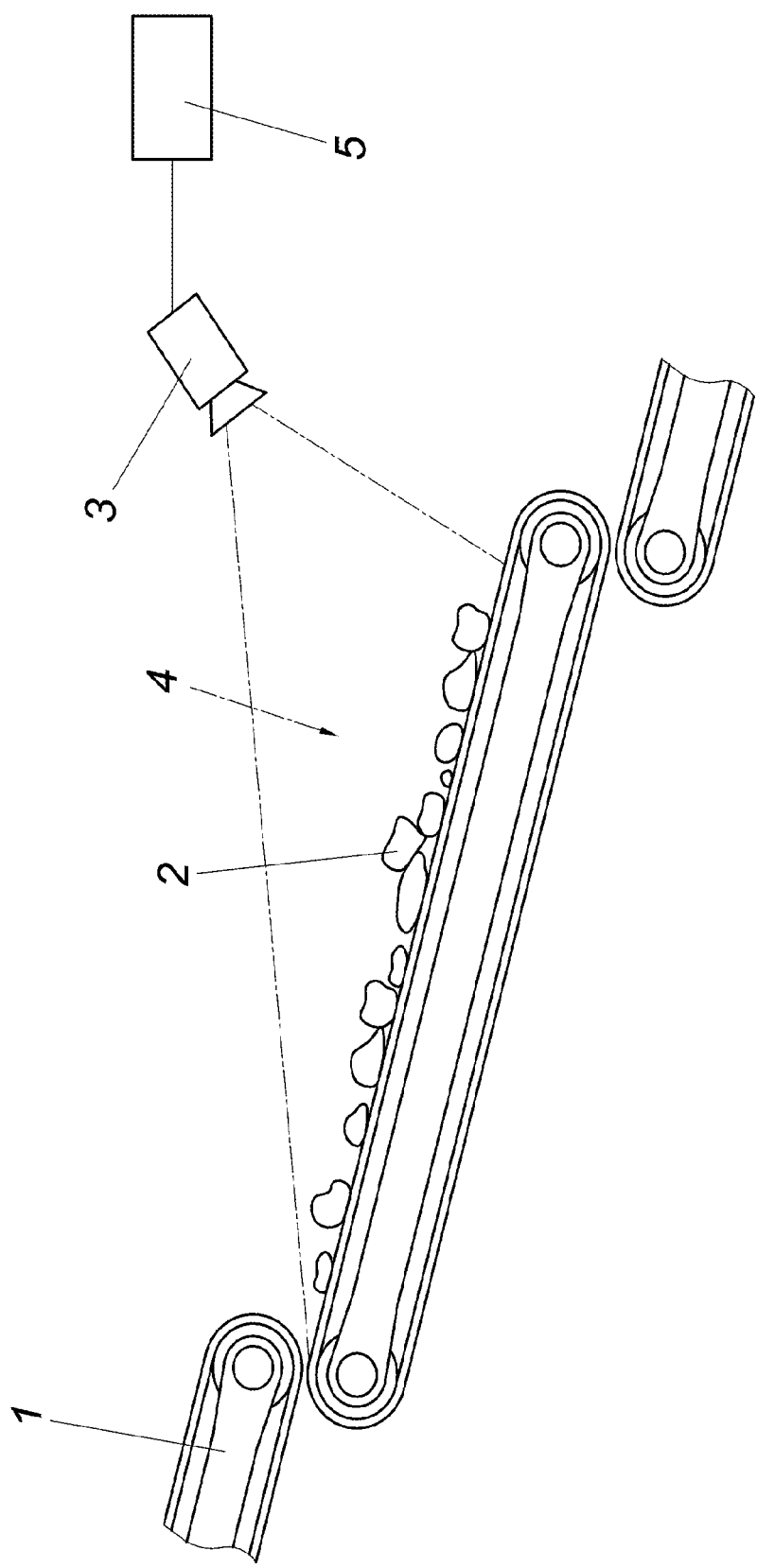
FIG. 1 shows a schematic side view of a conveyor belt loaded with bulk material, a depth sensor and a computing unit.

FIG. 1 shows a device for carrying out the method according to the invention, which comprises a conveyor belt 1 on which bulk material 2 has been fed. A depth sensor 3 creates depth images 6 of the bulk material 2 in a capturing region 4 of the depth sensor 3 and sends them to a computing unit 5.

Figure 2:
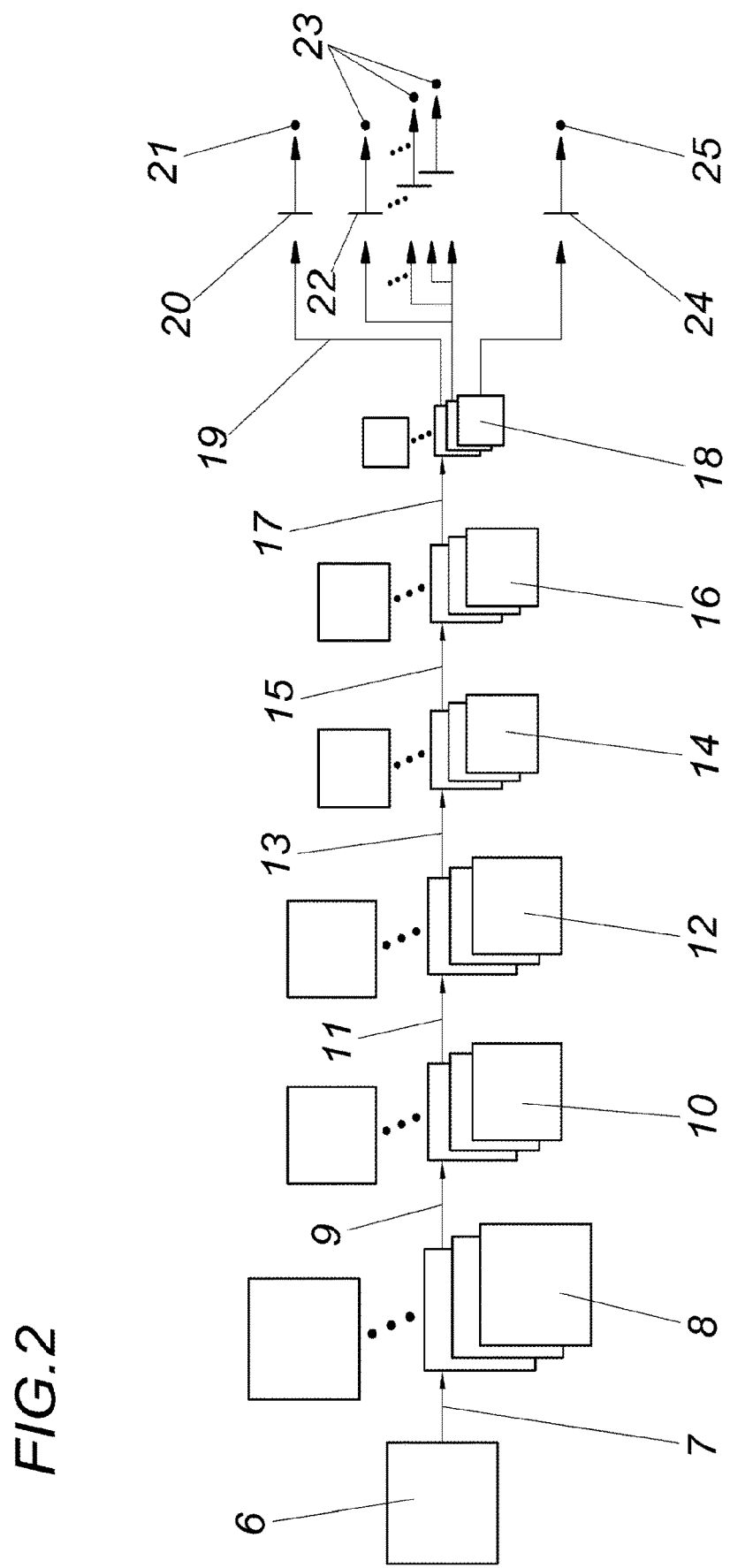
FIG. 2 shows a schematic representation of the convolutional neural network.

In the computing unit 5, the depth images are fed to a neural network and processed by it. The determination of the grain size distribution can include the following steps as an example and is shown for a depth image 6 in FIG. 2: In a first step 7, the depth image 6 is fed to the first convolutional layer. In this process, several outputs 8, so-called feature maps, are generated in the convolutional layer from the depth image 6 by pixel-wise convolution of the depth image 6 with a convolution kernel, which depict different aspects. These outputs 8 have the same dimensions and the same number of pixels as the depth image 6. In the next step 9, the number of pixels is reduced by means of a pooling layer. In this process, for each output 8, only the one with the highest value is selected from a square of, for example, 4 pixels and transferred to a corresponding pixel of the output 10, which is now compressed compared to the output 8. Since these squares overlap, this reduces the number of pixels by a factor of 2. Steps 7 and 9 are now repeated in additional layers, but in step 11 the convolution is applied to each output 10, further increasing the number of outputs 12 generated. Applying the pooling layer to the outputs 12 in step 13 further lowers the pixel count and produces outputs 14. Step 15 is analogous to step 11 and produces outputs 16. Step 17 is analogous to step 13 and lowers the pixel count and produces output 18. The application steps of the convolution and pooling layers can be repeated further depending on the aspects to be determined in depth image 6. In step 19, the pixels of the outputs 18 are aligned by dimensional reduction, and their information is transmitted to a classifier, such as a volume classifier 20, whose output value 21 may be output as the bulk volume present in the capturing region. Instead of or in addition to the volume classifier 20, amount classifiers 22 can be provided whose output values 23 form the relative or absolute quantities of the histogram of a grain size distribution. Furthermore, a cubicity classifier 24 can also be provided, the output value 25 of which corresponds to the average cubicity of the bulk material 2 present in the capturing region.

The structure of a training depth image 26 can be seen in FIG. 3. Here, four sample depth images 27, 28, 29, 30 of different grains measured in advance are combined to form a training depth image 25. The example depth images 27, 28, 29, 30 can be combined in any positioning and orientation to form a training depth image 26 and partially overlap. The overlaps are shown hatched in the training depth image 26.

The invention claimed is:

1. A method for determining a grain size distribution of parts of a bulk material fed onto a conveyor belt, said method comprising:
   capturing a two-dimensional depth image of the bulk material in sections in a capturing region with a depth sensor;
   feeding the captured two-dimensional depth image from the depth sensor to a previously trained convolutional neural network that has at least three successive convolutional layers and a plurality of downstream classifiers each outputting a respective output value for a respective class of the grain size distribution;
   wherein the captured two-dimensional depth image from the depth sensor is the only data input from the bulk material fed to the convolutional neural network; and
   outputting the output values of the convolutional neural network, wherein the output values indicate the grain size distribution of the bulk material present in the capturing region.

2. The method according to claim 1, wherein the method further comprises removing from the depth image values of pixels thereof that have a depth that corresponds to a previously detected distance between a depth sensor and a background for the pixel or that exceeds said distance.

3. The method according to claim 1, wherein a volume classifier is downstream of the convolutional layers and said volume classifier has an output value that is output as a volume of the bulk material present in the capturing region.

4. The method according to claim 1, wherein a cubicity classifier that outputs an output value as cubicity is downstream of the convolutional layers.

5. A training method for training a neural network for a method for determining a grain size distribution of parts of a bulk material fed onto a conveyor belt the training method comprising:
   capturing and storing example depth images each of an example grain with a known volume together with the volume; and
   combining a plurality of the example depth images randomly so as to form a training depth image having an amount of example grains per class assigned thereto as a grain size distribution thereof; and
   feeding the training depth image on an input side of the neural network and feeding the assigned grain size distribution thereof on an output side of amount classifiers of the neural network, wherein weights of individual network nodes of the neural network are adapted in a learning step.

6. The training method according to claim 5, wherein the example depth images are assembled with random alignment so as to form the training depth image.

7. The training method according to claim 5, wherein the example depth images are combined with partial overlaps so as to form the training depth image, wherein the training depth image has a depth value in an overlap region that corresponds to a lowest depth of both of the example depth images.

8. The training method according to claim 6, wherein the example depth images are combined with partial overlaps so as to form the training depth image, wherein the training depth image has a depth value in an overlap region that corresponds to a lowest depth of both of the example depth images.

9. The method according to claim 2, wherein a volume classifier is downstream of the convolutional layers and said volume classifier has an output value that is output as a volume of the bulk material present in the capturing region.

10. The method according to claim 2, wherein a cubicity classifier that outputs an output value as cubicity is downstream of the convolutional layers.

11. The method according to claim 3, wherein a cubicity classifier that outputs an output value as cubicity is downstream of the convolutional layers.

12. The method according to claim 9, wherein a cubicity classifier that outputs an output value as cubicity is downstream of the convolutional layers.

13. The method according to claim 1, wherein the two-dimensional depth image is a set of pixels each having one respective data value corresponding to a respective distance for said pixel from the depth sensor to an associated location on the bulk material.

* * * * *